Oct. 4, 1932.　　　　V. G. APPLE　　　1,881,344
MOTOR COMPRESSOR
Filed Jan. 16, 1931　　　2 Sheets-Sheet 1

INVENTOR
Vincent G. Apple

Oct. 4, 1932.  V. G. APPLE  1,881,344

MOTOR COMPRESSOR

Filed Jan. 16, 1931  2 Sheets-Sheet 2

INVENTOR

Vincent G. Apple

Patented Oct. 4, 1932

1,881,344

UNITED STATES PATENT OFFICE

VINCENT G. APPLE, OF DAYTON, OHIO

MOTOR COMPRESSOR

Application filed January 16, 1931. Serial No. 509,112.

This invention relates to power driven compressors and more particularly to compressors wherein the operative compressing means is directly connected to a prime mover, preferably an electric motor.

An object of the invention is to so combine an electric motor and a compressor as to utilize otherwise unused space within the motor to contain the compressor.

Another object is to so arrange the several parts of my structure that one and the same pair of journals and bearings may serve as the sole rotative support both for a compressor and a motor, to the end that my improved structure will require less journals and bearings than a conventional structure.

Another object is to provide a vacuum tight enclosure about the movable elements of both a compressor and a motor from which no rotatable or otherwise operable members need extend, whereby I may eliminate the usual stuffing box which must surround the rotatable shaft or otherwise operable compressing means of conventional compressors where said shaft or other means emerges from the compressor casing, and whereby any leakage from the compressor around said operable pumping means is necessarily only into the vacuum tight interior of the motor.

Another object is to provide such a structure wherein the interior of the motor is a vacuum tight chamber which is in communication with the pressure tight chamber of the compressor only by the slight running clearance between the journal and the common bearing situated between the motor chamber and the compressing chamber, and to open the intake port of the compressor into the vacuum tight motor chamber and then connect the said motor chamber to the suction side of the line, to the end that slight leakage of gas from the compressing chamber to the motor chamber through the slight clearance between the journal and the bearing situated between the two chambers will get only so far as the suction side of the line.

Another object is to employ in an electric motor a stator having a vacuum tight body composed entirely of a non-hygroscopic, acid gas resisting insulation within the walls of which the windings are enclosed and hermetically sealed, to the end that corrosive gases may be compressed and the contact of such gases with the motor housing will have no deleterious effect on the motor winding.

I attain these objects by the structure disclosed in the following description of a preferred embodiment of my invention comprising an electric motor and a rotary compressor, said description being facilitated by reference to the accompanying drawings wherein, Fig. 1 is an axial section taken at 1—1 of Fig. 2 through an electric motor driven rotary compressor.

Similar numerals refer to similar parts throughout the several views.

Figure 1:
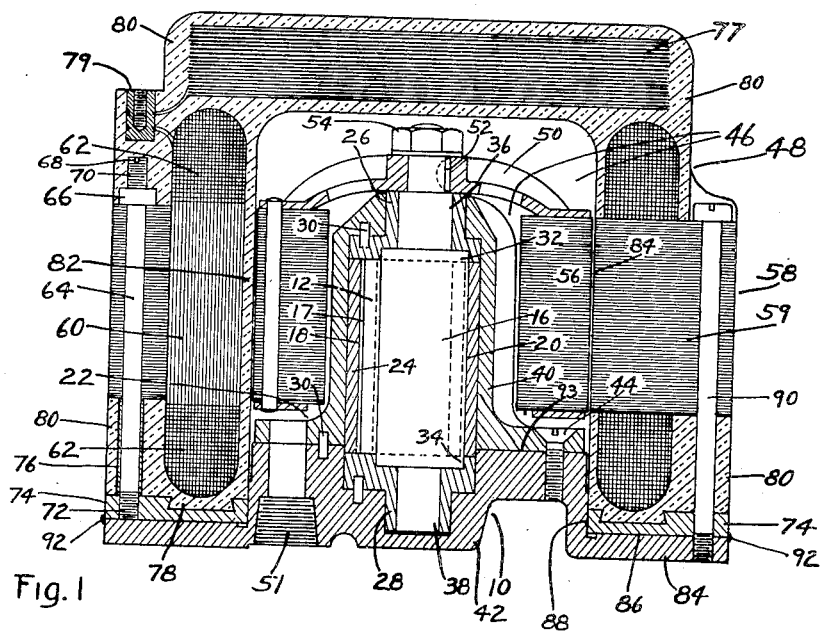
Figure 2:
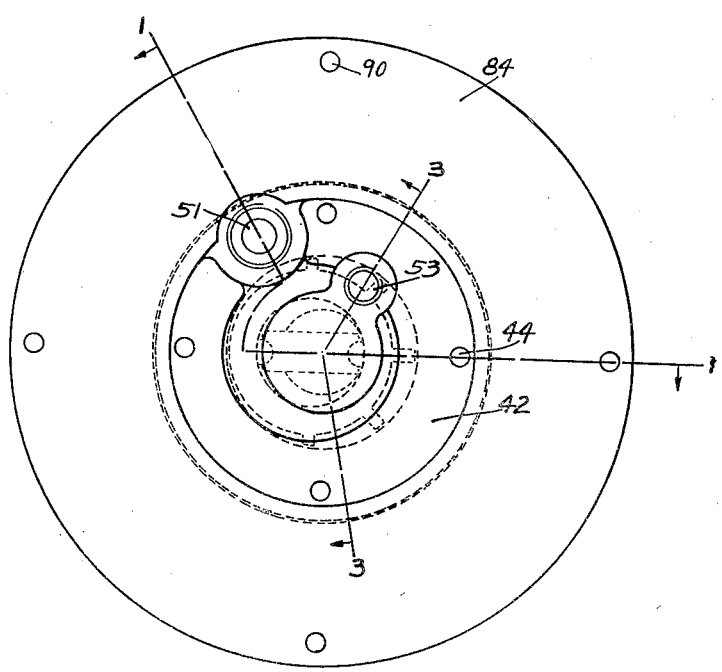
Fig. 2 is a bottom end view of the device.
Figure 3:
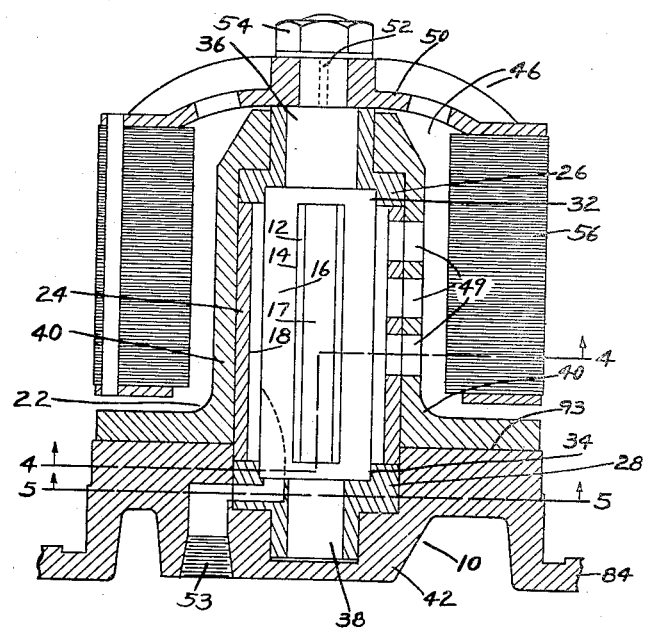
Fig. 3 is an axial section taken at 3—3 of Figs. 2, 4 and 5.
Figure 4:
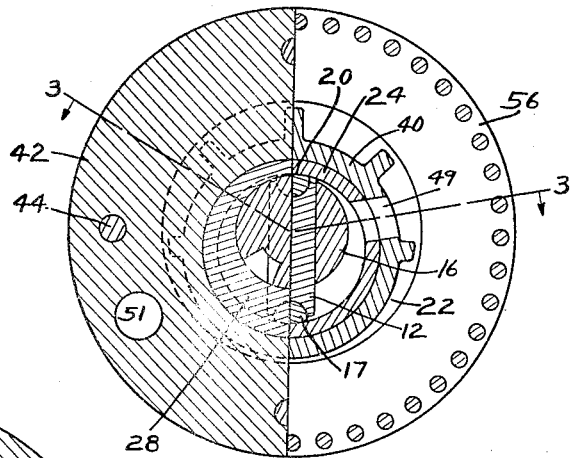
Fig. 4 is a transverse section taken at 4—4 of Fig. 3.
Figure 5:
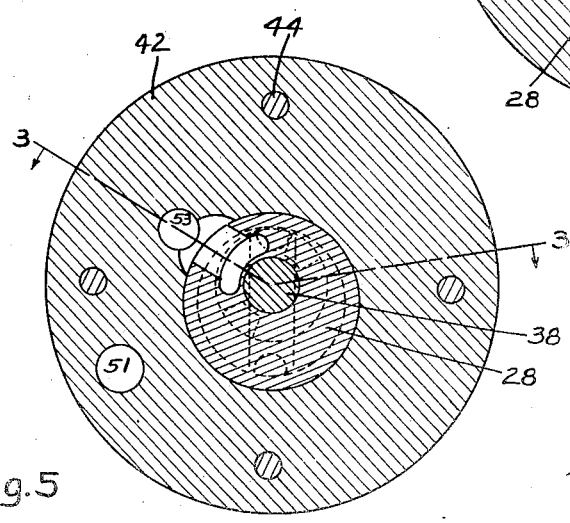
Fig. 5 is a transverse section taken at 5—5 of Fig. 3.

In the illustrative embodiment of my invention I employ a rotary compressor 10 of a known type wherein a one piece blade 12 is slidably fitted to a slot 14 which extends through a cylinder compressor rotor 16, the blade 12 having rocker type seals 17 between the ends of the blade and the wall of the compressing chamber 18. The cross section of the compressing chamber 18 in this type of compressor is of larger diameter than the compressor rotor 16 and is not a true circle but takes the oval shape known as the Utley curve; the axis of the compressor rotor 16 being then sufficiently eccentric to the axis of the compressing chamber 18 to bring one side of the compressor rotor in contact with one side of the compressing chamber as at 20.

The compressor casing 22 is lined with a tubular sleeve 24 within which the Utley curved compressing chamber is formed. This sleeve is preferably press fitted to the compressor casing. The material of which this sleeve is composed is selected for its wearing quality and for its ability to resist the action of the particular gas being compressed. The bearing members 26 and 28 are also tightly fitted to the compressor casing. Pins 30 provide added security to prevent the bearing member from turning in the casing. The bearing members, like the sleeve 24 are preferably of a material resistant to the action of the gases being compressed.

The slot 14 of compressor rotor 16 and the blade 12 are the same length as the sleeve 24, but the compressor rotor is somewhat longer and extends into the bearing members 26 and 28 as at 32 and 34. The remainder of the compressor rotor is reduced in diameter to provide journals 36 and 38 which are rotatable in bearing members 26 and 28. To facilitate assembly of the compressor rotor into the compressor casing 22 the casing is made in two parts 40 and 42 held together by screws 44. It will be observed (see Fig. 1) that neither the bearing member 28 nor the journal 38 extend through the compressor casing 22 to the outside, so that no leakage may occur from the compressing chamber 14 at this end. But at the upper end of the compressor casing the journal 36 extends through the bearing member 26 and into the motor chamber 46 of the motor 48. A spider 50 is keyed to this extending end by the key 52 and is further secured by the nut 54.

The laminated motor rotor 56 is of the squirrel cage type and is secured to the spider 50 to rotate therewith. The compressor suction ports 49 connect the compressing chamber 18 to the motor chamber 46 and a pipe tapped suction opening 51 is provided for connecting the motor chamber 46 to the suction line. A similar discharge opening 53 connects the compressing chamber 18 to the pressure line.

The motor stator 58 has a laminated core 59 slotted for a winding, with coil sides 60 in the slots and coil heads 62 extending beyond the ends of the core. Long studs 64 extend lengthwise through the core, the ends 66 being slightly enlarged to provide a shoulder. The ends are slotted at 68 and threaded at 70. The opposite ends of the studs 64 are threaded at 72 into an end plate 74. Sleeves 76 keep the end plate 74 definitely spaced apart from the core 59. The end plate 74 is dovetailed at 78 for a purpose which will presently appear.

The insulation which unites the several parts of the stator 58 comprises one continuous body 80 molded in situ about the core 59, the coil sides 60, the coil heads 62, the studs 64, the end plate 74, the starting condenser 77 and the line terminals 79. It will be observed that the insulation completely seals the winding from communication with the motor chamber 46, extending through the inner ends of the winding slots so as to cover the coil sides 60 as at 82. The entire inner surface of the stator body 80 which forms the outer wall of the motor chamber 46 is therefore composed of insulation except where the ends of the core teeth extend through the insulation surface as at 84. There are a number of plastic molding compounds which may be employed for molding the stator body 80, some of them resistant to one thing and some of them to another, so that the kind of insulation to be employed for the body 80 may be determined with reference to the kind of gases to be compressed. Likewise the metal surfaces exposed in the interior of the motor may be plated or coated with a material selected in the same manner.

The part 42 of the compressor casing 22 has a flange 84 which makes a pressure tight joint with the motor end plate 74 along the line 86. Concentricity between the motor stator and the compressor is maintained by extending the compressor part 42 into the motor chamber 46 at 88. Screws 90 may be employed to maintain the joint along the line 88. A gasket may be inserted, or, in cases where a more perfect seal is required, it may be justifiable to solder entirely around the structure as at 92, this solder being removable by heating when disassembly of the motor is required.

It will be observed that joint 93 between the parts 40 and 42 of the compressor casing 22 is entirely within the vacuum tight rotor chamber so that slight leakage at this joint would result only in a small quantity of fluid escaping into the rotor chamber 46 and being returned through openings 49.

From a consideration of the foregoing description and the drawings it will be seen that a compressor constructed as herein shown and described is unlike the conventional compressor in that it has no operative member extending from the compressor casing to the outside to be connected to a source of power, by which the customary stuffing box, which necessarily surrounds such operative members in conventional compressors, is entirely eliminated.

As before pointed out the only joint which could by any possibility leak would be along the line 86, and it may be further observed that leakage through this joint, because of vacuum in the motor chamber 46 would be leakage of atmosphere into the motor chamber and not of gases from the motor chamber to the atmosphere, and, as before indicated, if this possibility is objectionable the joint 92 may readily be made absolutely tight by soldering.

While in the drawings I have shown and described a compressor of the rotary type, it is obvious that some of the objects of my invention could be as readily carried out by employing a compressor of the centrifugal, reciprocating, or other type, and it is to be understood that in the following claims the terminology "rotative compressing means" may refer to a compressor rotor, an impeller, or the rotatable shaft of any power driven pump, and that "operative compressing means" may refer to any compressing means which must be operatively connected to a motor, and which by its inherent nature is bound to permit some leakage of the gas being compressed through such connection into said motor.

I claim:

1. A motor compressor comprising a hollow stator body of hardened insulation open at one end, a stator core imbedded in and solely supported by said hollow stator body, a stator winding completely enclosed and sealed in the walls of said hollow stator body, a hollow electric motor rotor revolvable in said stator body, a hollow compressor casing, open at one end, within said motor rotor, a single bearing head secured to the open ends of both the stator body and the compressor casing, forming a vacuum tight chamber in the stator body and a separate pressure tight chamber in the compressor casing, a bearing in the inner face of said bearing head, a second bearing in the closed end of said compressor casing, a compressor rotor rotatably supported in said bearings and having a short stub end extending through the closed end of said compressor casing into the vacuum tight stator chamber, and a driving spider secured to said stub end and to the end of said motor rotor, there being an opening into the stator chamber adapted for connection to the suction line, an opening into the compressor chamber adapted for connection to the discharge line and a suction opening through the wall of said compressor casing connecting the compressor chamber and the stator chamber.

2. A motor compressor comprising a hollow stator body open at the bottom end, a bearing head secured to said open end forming a vacuum tight motor chamber and having an opening adapted for connecting said motor chamber to the suction line, a hollow compressor casing open at the bottom end secured to the inner wall of said bearing head forming a pressure tight compressor chamber, said bearing head having a second opening adapted to connect said compressor chamber to the discharge line, a bearing on the inner surface of said bearing head within said compressor chamber, a second bearing in the closed end of said compressor casing, a compressor rotor within the compressor chamber having rotative support in said bearings and having a stub end extending through the bearing at the closed end into the said motor chamber, a driving spider secured to said stub end for rotation therewith, and a hollow electric motor rotor depending from the under face of said spider into the space within said motor chamber surrounding said compressor casing, there being a suction opening in the wall of said compressor casing connecting the compressor and the motor chambers.

In testimony whereof I affix my signature.

VINCENT G. APPLE.